C. H. Amidon,
Bit Stock.
Nº 50,214.      Patented Oct. 3, 1865.
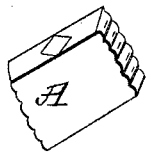
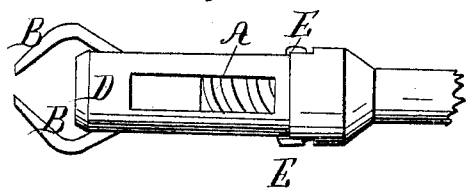
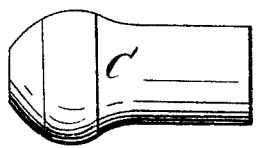
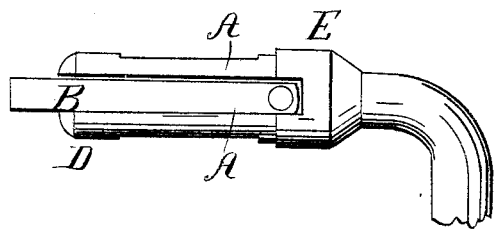
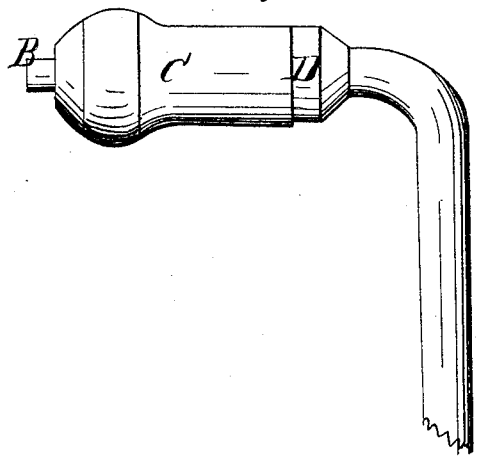
Witnesses,
Austin DeWolf
L. J. Gunn
Inventor,
Charles H. Amidon

UNITED STATES PATENT OFFICE.

CHARLES H. AMIDON, OF GREENFIELD, MASSACHUSETTS.

IMPROVEMENT IN BIT-STOCKS.

Specification forming part of Letters Patent No. 50,214, dated October 3, 1865.

*To all whom it may concern:*

Be it known that I, CHARLES H. AMIDON, of Greenfield, in the county of Franklin and State of Massachusetts, have invented a new and Improved Bit-Brace; and I do hereby declare that the following is a full and exact description thereof, reference being had to the accompanying drawings, and to the letters of reference marked thereon.

Figure 1 represents the tool with the several parts in their proper position ready to receive the bit. Figs. 2 and 3 represent the tool with the nut C removed. Fig. 4 represents the nut or screw. Fig. 5 represents the movable socket. Fig. 6 represents a side view of one of the jaws.

The nature of my invention consists in providing a bit-stock with a movable socket-block to hold the head of the bit from turning in the stock, in combination with a pair of movable jaws to gripe the shank of the bit, and a screw-nut or sleeve to operate both socket and jaws at one operation, thereby securing not only great facility of action, but greater steadiness and truth than is commonly attained.

That others may understand the construction and operation of my invention, I will more particularly describe it.

The shank D of the bit-stock is in the form of a cylinder, and has a long slot cut through it transversely and in the direction of its length. (See Fig. 3.) It is also provided with seats for the jaws B B, as shown at Fig. 2.

A is the movable socket-block, provided with a square socket, for the head of the bit. It is of such form as to fit the slot through the shank D, and move freely therein in the direction of the axis of the stock. The edges of A project a little beyond the surface of D, so that a screw-thread may be cut upon them.

The jaws B B are secured in their seats upon the shank of the stock by the screws E E or by other suitable means. They are constructed in the form shown in Fig. 6, so that when in position their outer surfaces, near their free ends, may be receding planes, as shown in Fig. 3, and therefore when the sleeve C is drawn over them in a line with the axis of the stock their free ends will be forced toward each other and the shank of the bit be firmly griped between them.

The sleeve C is preferably of the form shown, the bulb being designed to cover the elbows of the jaws. Upon the inner surface of the cylindrical portion of the sleeve is a female screw adapted to the male screw upon the edges of the socket-block A, so that when I desire to fasten a bit to my stock the sleeve is to be unscrewed from the block A far enough to allow the jaws B B to recede from each other so far as may be necessary to admit the head of the bit between them. When the bit is in position I turn the sleeve so as to screw it upon the block A again, at the same time pressing down upon it, so as to force the jaws together. In this way the socket-block is drawn up until the head of the bit is confined between the inner sides of the jaws and the socket, where it may be clamped as firmly as necessary by continuing to turn the sleeve.

If for any cause it is desirable to remove the working parts of my invention, it may be done easily by unscrewing the sleeve C until it is free from the socket, when it may be drawn off from the shank D and the socket removed from its slot. The jaws may be taken off by removing the screws E E.

Having described my invention, what I claim as new, and desire to secure by Letters Patent, is—

The combination of the movable screw-socket A, jaws B B, and sleeve C with a bit-stock, when constructed and operating substantially as described.

CHARLES H. AMIDON.

In presence of—
AUSTIN DE WOLF,
L. J. GUNN.